(12) United States Patent
Yokota et al.

(10) Patent No.: US 7,530,633 B2
(45) Date of Patent: May 12, 2009

(54) SEAT BACK STRUCTURE OF VEHICLE SEAT

(75) Inventors: Masaaki Yokota, Akishima (JP); Atsushi Koike, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 57 days.

(21) Appl. No.: 11/581,385

(22) Filed: Oct. 17, 2006

(65) Prior Publication Data

US 2008/0088158 A1    Apr. 17, 2008

(51) Int. Cl.
*B60N 2/42* (2006.01)
(52) U.S. Cl. .............. 297/216.12; 297/216.13; 297/404; 297/407; 297/408
(58) Field of Classification Search ............ 297/216.12, 297/216.13, 404, 407, 408, 409, 216.14
See application file for complete search history.

(56) References Cited

U.S. PATENT DOCUMENTS

| | | | | |
|---|---|---|---|---|
| 5,795,019 A | * | 8/1998 | Wieclawski ............ | 297/216.12 |
| 6,024,406 A | * | 2/2000 | Charras et al. ......... | 297/216.14 |
| 6,199,947 B1 | * | 3/2001 | Wiklund ................ | 297/216.12 |
| 6,523,892 B1 | * | 2/2003 | Kage et al. ............. | 297/216.13 |
| 6,789,846 B2 | * | 9/2004 | Humer et al. .......... | 297/216.12 |
| 6,837,541 B2 | * | 1/2005 | Farquhar et al. ....... | 297/216.13 |
| 7,077,472 B2 | * | 7/2006 | Steffens, Jr. ........... | 297/216.13 |
| 7,234,769 B2 | * | 6/2007 | Takenaka et al. ....... | 297/216.12 |
| 7,284,794 B2 | * | 10/2007 | Yamaguchi et al. .... | 297/216.12 |

FOREIGN PATENT DOCUMENTS

JP    2001-026232    1/2001

* cited by examiner

*Primary Examiner*—Laurie K Cranmer
(74) *Attorney, Agent, or Firm*—Browdy and Neimark, PLLC

(57) ABSTRACT

In a seat back structure, an auxiliary frame having a pressure receiving portion and a headrest mounted thereon is movably provided in seat back frame via guide element and link element. The guide and link elements are respectively disposed in upper and lower portions respectively of the auxiliary and seat back frames. Biasing element is provided to the link element, such that a line of force of the former is positioned on one side of a pivotal point of the link element, thereby retaining the headrest at initial position, and that, when excessive backward load is applied to the pressure receiving portion, the link element is rotated to displace the line of force toward another side of the first pivotal point, whereby the auxiliary frame is displaced forwardly and upwardly of the seat back frame, thereby causing the headrest to move to a position for supporting a head of seat occupant.

4 Claims, 4 Drawing Sheets

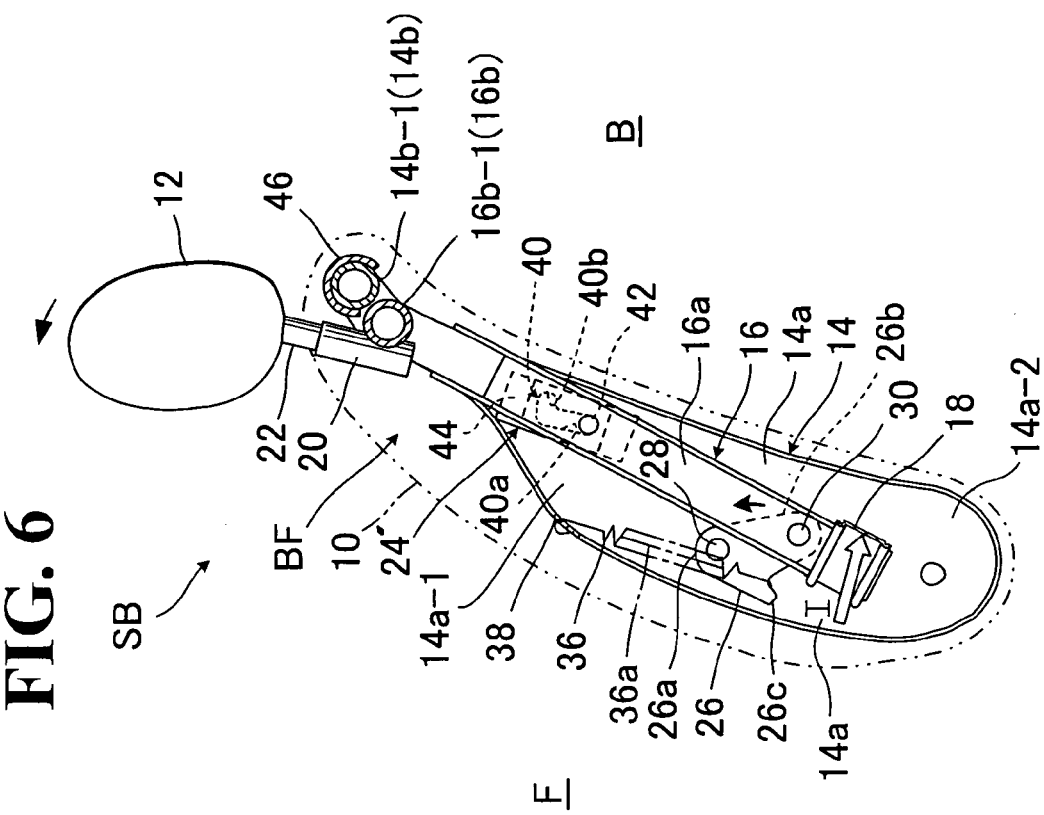
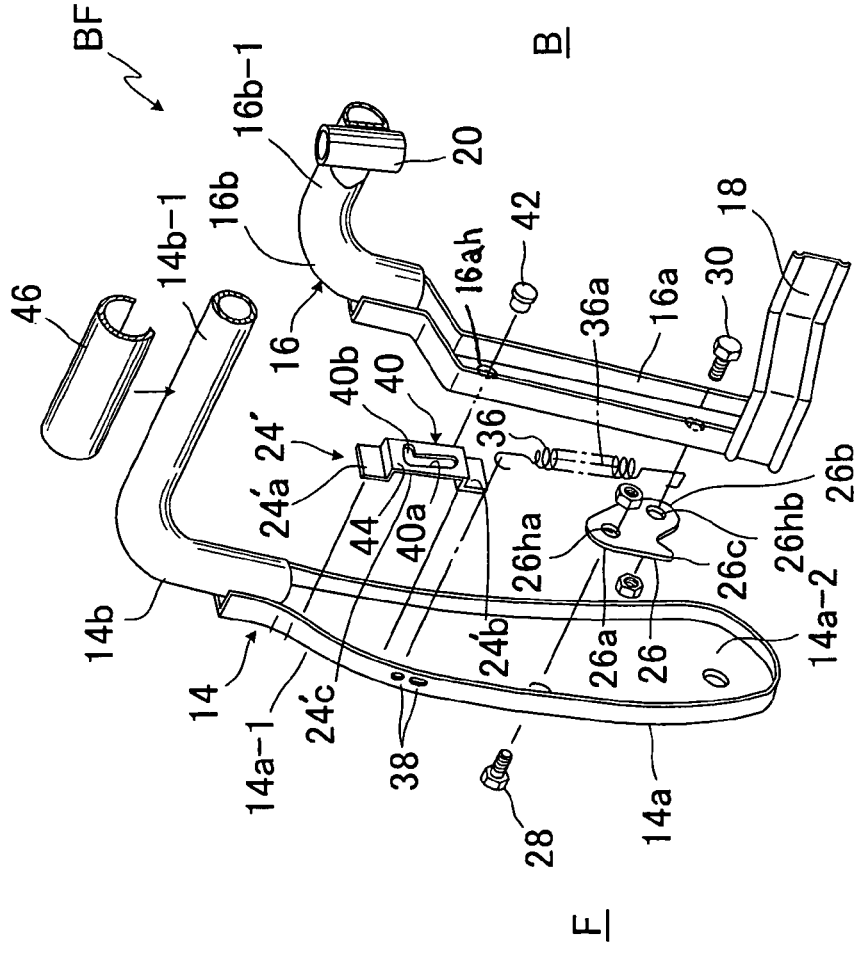

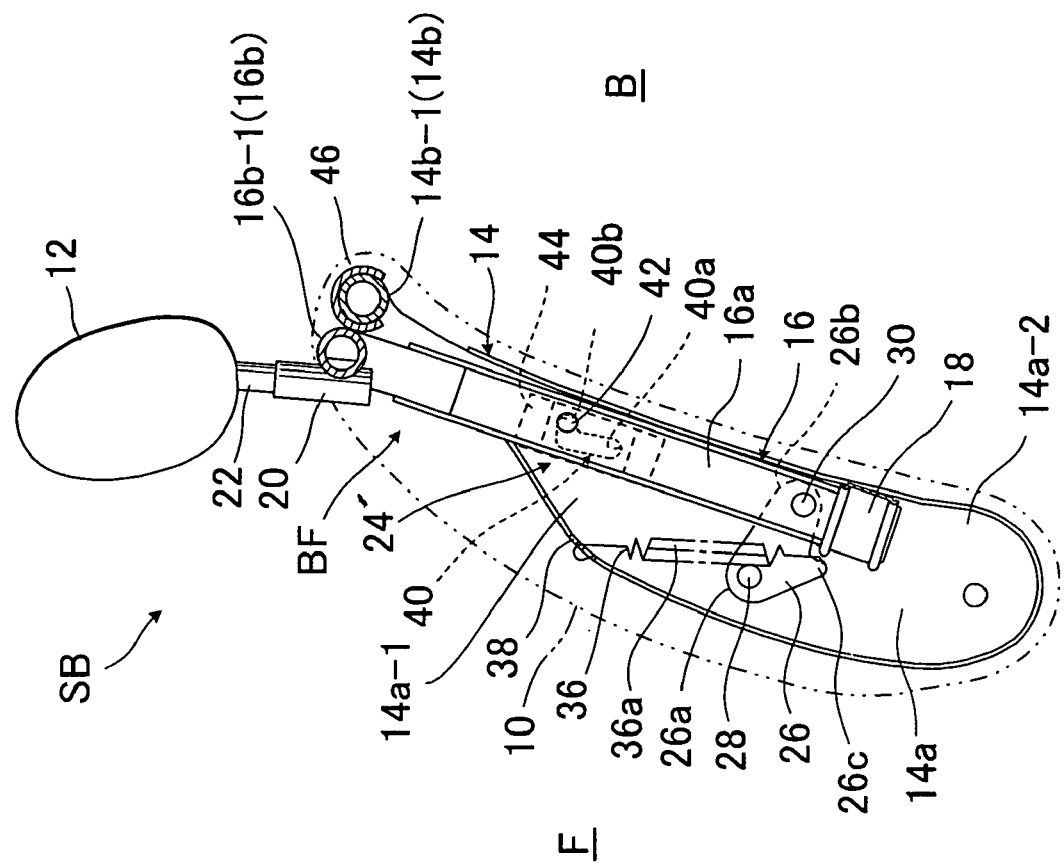
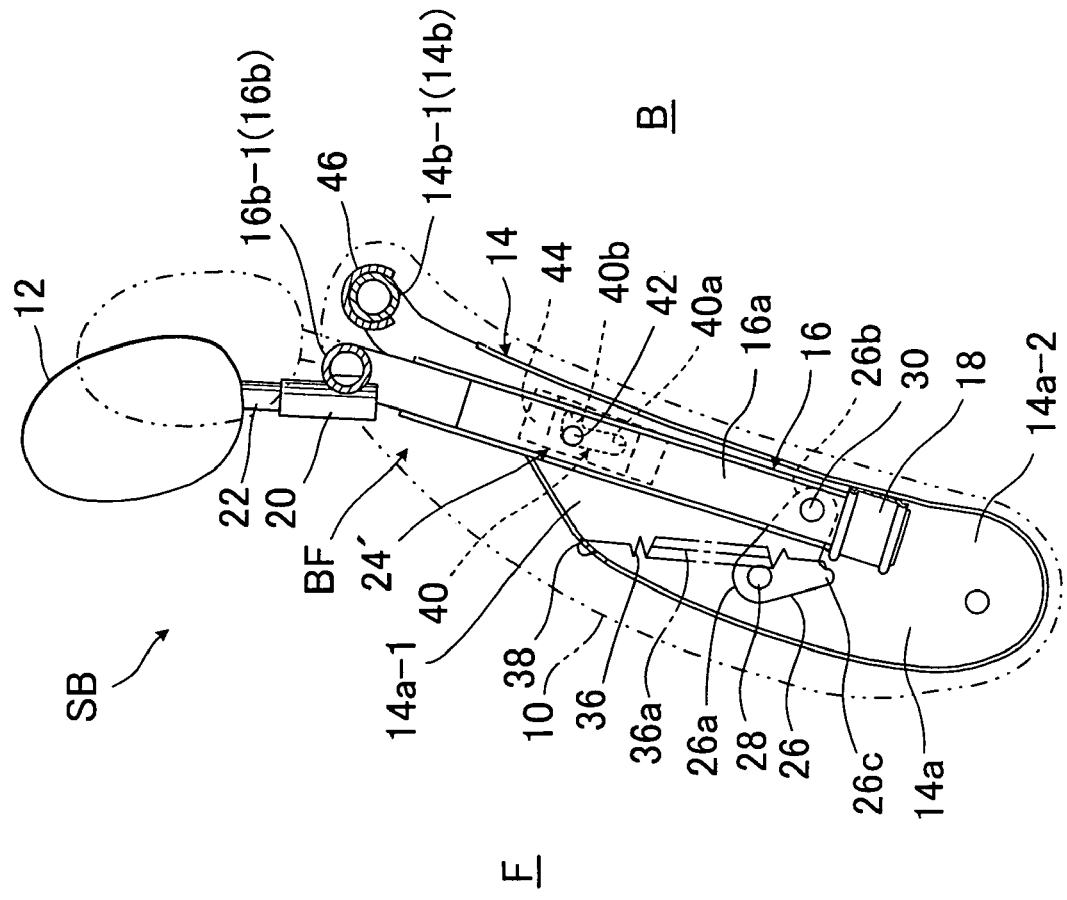

SEAT BACK STRUCTURE OF VEHICLE SEAT

BACKGROUND OF THE INVENTION

1. Field of the Invention

The present invention relates to a seat back of vehicle seat with a movable headrest. In particular, the invention is directed to a structure of seat back of seat for vehicle which permits a headrest mounted in the seat back to be displaceable in forward and upward directions in response to a rear-end collision occurred to the vehicle.

2. Description of Prior Art

Among vehicle seats with headrest, there has been known a vehicle seat of such type that, responsive to a rear end collision, a headrest mounted thereon is subjected to forward movement under a backward force of inertia applied from a waist portion of the occupant and moved toward a head portion of occupant on the seat. For example, the Japanese Laid-Open Patent Publication No. 2001-26232 discloses the vehicle seat of this kind. According thereto, the seat back thereof includes a seat back frame and an auxiliary frame, such that a lower portion of the auxiliary frame is rotatably connected via a lower link with the seat back frame. A headrest is fixed on the top of the auxiliary frame to support a head of seat occupant, while a pressure receiving portion is provided in the lower region of the auxiliary frame at a point where a waist portion of the seat occupant is positioned. When a rear-end collision occurs, a backward load is applied to that pressure receiving portion from the seat occupant's waist portion which is moved backwardly under an inertia caused by the rear-end collision. Then, due to such backward load, the auxiliary frame is rotated forwardly of the seat back frame relative to the lower link, which causes simultaneous forward displacement of both headrest and upper portion of the auxiliary frame, thereby providing a quick support to the occupant's head and upper body portion.

In this conventional seat back structure, the auxiliary frame is normally biased by a biasing means, such as a spiral spring, in a direction to a given home position against the forward movement stated above. However, such biasing arrangement gives a full biasing force of the biasing means directly to both of the auxiliary frame and headrest, which undesirably results in giving a counterforce or resistance to the afore-discussed quick forward displacement of those auxiliary frame and headrest in the case of rear-end collision. Consequently, this prior art has been with the following problems: (i) When a minor rear-end collision occurs under a relatively slow speed of rearward vehicle, the auxiliary frame is slowly displaced in the forward direction due to a weak inertia or a week backward load being applied from the seat occupant and therefore, such week backward load is almost counterbalanced by the biasing force of the biasing means, so that the forward displacement of auxiliary frame becomes slow and therefore the occupant's head is not quickly received and supported by the headrest, and (ii), on the other hand, when a great abrupt rear-end collision occurs under a high speed of rearward vehicle, a great load is naturally applied from the seat occupant's waist portion to the pressure receiving portion, but a much greater load than such load is applied from the seat occupant's head to the headrest, as a result of which, the headrest, which is resiliently biased by the biasing means to a home position, is brought to keen contact with the seat back frame, overcoming the biasing force, thereby giving a corresponding greater load to the seat back frame. In the latter case, an excessive great load is directly exerted on the seat back frame from the headrest, which in turn causes an abrupt excessive backward inclination of the seat back frame or seat back. Hence, it is highly possible that a serious damage will be given to both seat back and seat occupant. Naturally, this undesired condition requires a rigid and robust construction of the seat back frame per se, which includes increasing a thickness of the seat back frame enough to withstand the foregoing great load applied from the headrest. But, such reinforcement of seat back frame will undesirably increases the weight of seat as well as costs involved.

SUMMARY OF THE INVENTION

In view of the afore-stated drawbacks, it is a primary purpose of the present invention to provide an improved seat back structure in a vehicle seat, which is simplified in structure to insure proper displacement of headrest to a seat occupant's head in response to a major or minor rear-end collision, while preventing a seat back frame against damage.

In order to achieve such purpose, a seat back structure in accordance with the present invention is basically comprised of:

a seat back frame having an upper portion and a lower portion;

an auxiliary frame provided independently of the seat back frame, the auxiliary frame having an upper portion and a lower portion;

a headrest provided on the upper portion of the auxiliary frame;

a pressure receiving portion provided in the lower portion of the auxiliary frame;

a guide means provided between the upper portion of the seat back frame and the upper portion of the afore-said one auxiliary frame;

a link means rotatably provided between the lower portion of the seat back frame and the lower portion of the auxiliary frame, the link means including: a first pivotal point at which one end of the link means is pivotally supported to the seat back frame; and a second pivotal point at which another end of the link means is pivotally supported to the auxiliary frame; and the guide means being adapted for guiding the upper portion of the auxiliary frame in a predetermined direction in conjunction with the link means, wherein the auxiliary frame is displaceable via the link means and guide means so as to move the headrest between an initial position where the headrest is normally set and another position defined above the initial position, and a biasing means having a line of force therein, the biasing means being connected between the link means and the seat back frame, with such an arrangement that, when the headrest is set in the initial position, the line of force of the biasing means is positioned on one side of the first pivotal point, whereby the biasing means acts to biasingly retain both link means and auxiliary frame against movement, so that the headrest is retained at the initial position, and that, when an excessive backward load is applied to the pressure receiving portion, overcoming a biasing force of the biasing means, the link means is rotated to cause displacement of the line of force of the biasing means toward another side of the first pivotal point, whereby the auxiliary frame is biasingly caused by the thus-displaced biasing means to displace in a direction forwardly and upwardly of the seat back frame via the guide means and the link means, so that the headrest is moved from the initial position to the afore-said another position.

In one aspect of the present invention, the seat back frame may include a top frame member, while the auxiliary frame may include a top frame member, and the guide means and the link means may be arranged such that, when the auxiliary frame is biasingly caused by the biasing means to displace in the direction forwardly and upwardly of the seat back frame, the top frame member of the auxiliary frame is guided by the guide means so as to avoid contact thereof with the top frame member of the seat back frame, thereby allowing smooth movement of the headrest from the initial position to the afore-said another position.

It is a second purpose of the present invention to insure a more proper movement of the headrest in the foregoing seat back structure in a major rear-end collision case, which effectively avoids serious damage to the seat occupant's head.

To achieve such purpose, the guide means may comprises: a guide element fixed to the upper portion of the seat back frame, the guide element having a generally hook-like guide hole formed by a vertical hole potion and an arcuate hole portion communicating with the vertical hole portion; and a guide pin fixed to the upper portion of the auxiliary frame, wherein the guide pin is slidably engaged in the generally hook-like guide hole. Accordingly, when the excessive backward load is exerted on the auxiliary frame, through the above-described actions of the link and guide means, the guide pin is moved upwardly along the vertical hole portion and then moved along the arcuate hole portion relative to the foregoing second pivotal point, thereby guiding the headrest backwardly. This allows backward movement of the seat occupant's head together with the thus-guided headrest, hence preventing the seat occupant's head from being seriously hit against the headrest.

Other various features and advantages will become apparent from reading of the description hereinafter, with reference to the annexed drawings.

BRIEF DESCRIPTION OF THE DRAWINGS

FIG. 5 is a partly broken exploded perspective view of a second embodiment of the seat back structure in accordance with the present invention;

FIG. 6 is a longitudinally sectional view of the second embodiment, which explanatorily shows how an auxiliary frame and a headrest are displaced from their respective initial positions in a rear-end collision case;

FIG. 7 is a longitudinally sectional view of the second embodiment, which explanatorily shows the state where the auxiliary frame and headrest are displaced to a given position to provide an emergency head support; and FIG. 8 is a longitudinally sectional view of the second embodiment, which explanatorily shows the state where the auxiliary frame and headrest are displaced backwardly from the given position to reduce an impact in the headrest.

DETAILED DESCRIPTION OF PREFERRED EMBODIMENTS OF THE INVENTION

Figure 1:
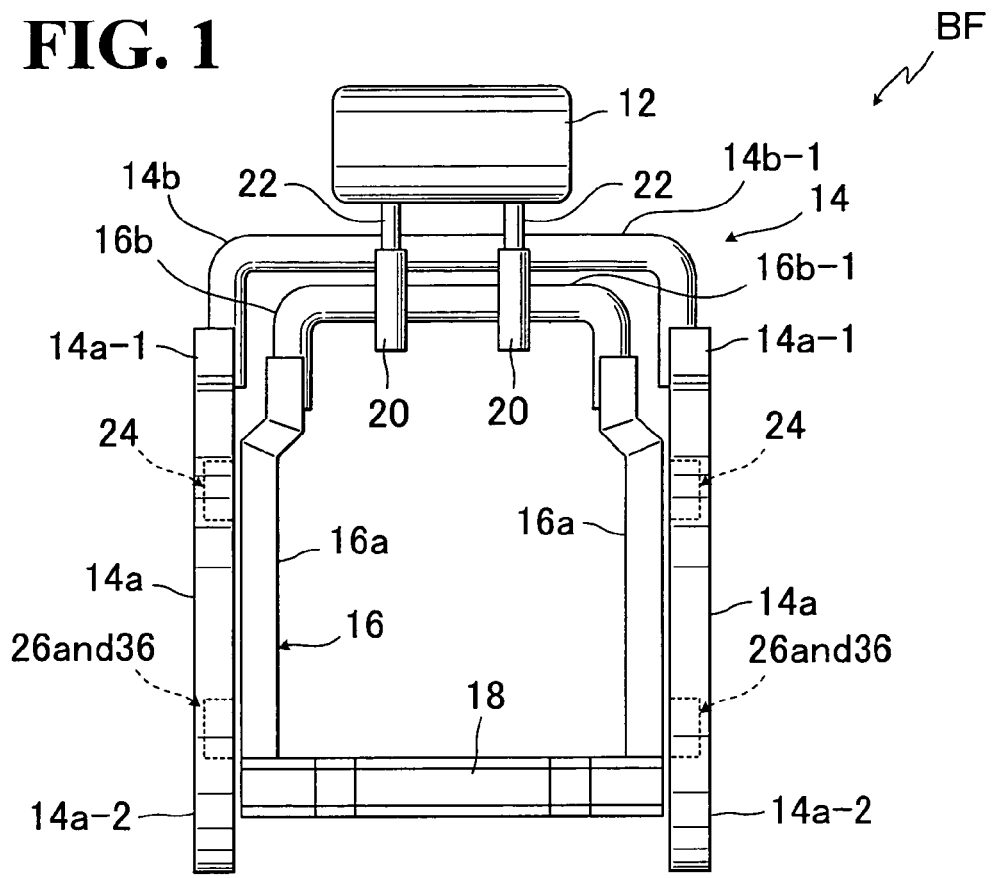
FIG. 1 is a plan view for generically showing a whole of seat back structure in a vehicle seat in accordance with the present invention.
Figure 2:
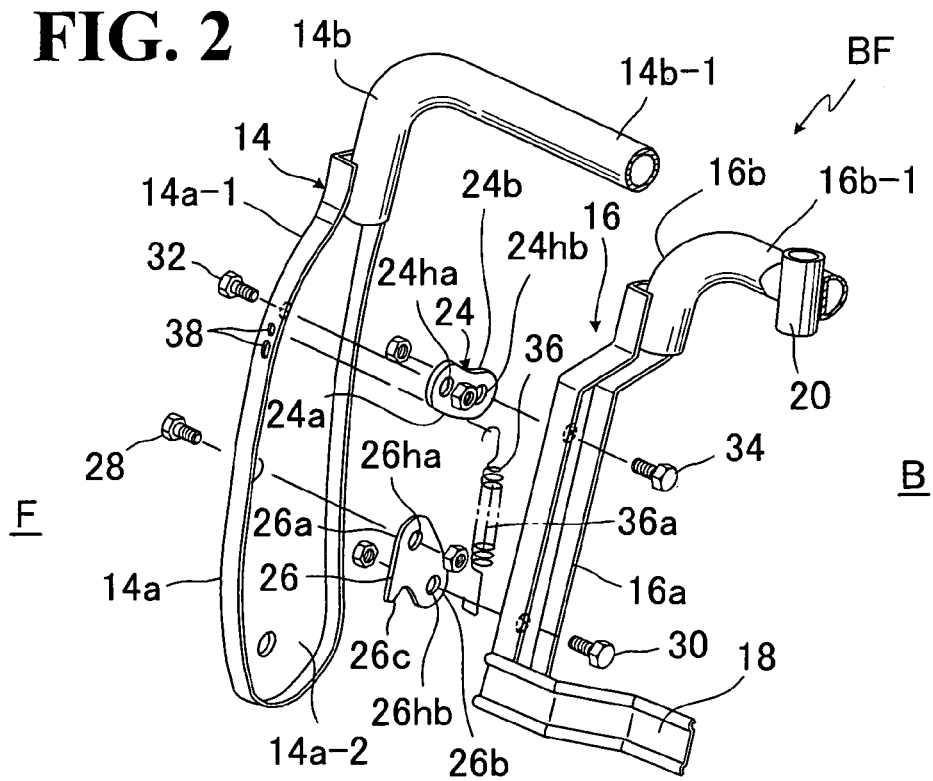
FIG. 2 is a partly broken exploded perspective view of a first embodiment of the seat back structure in accordance with the present invention.
Figure 3:
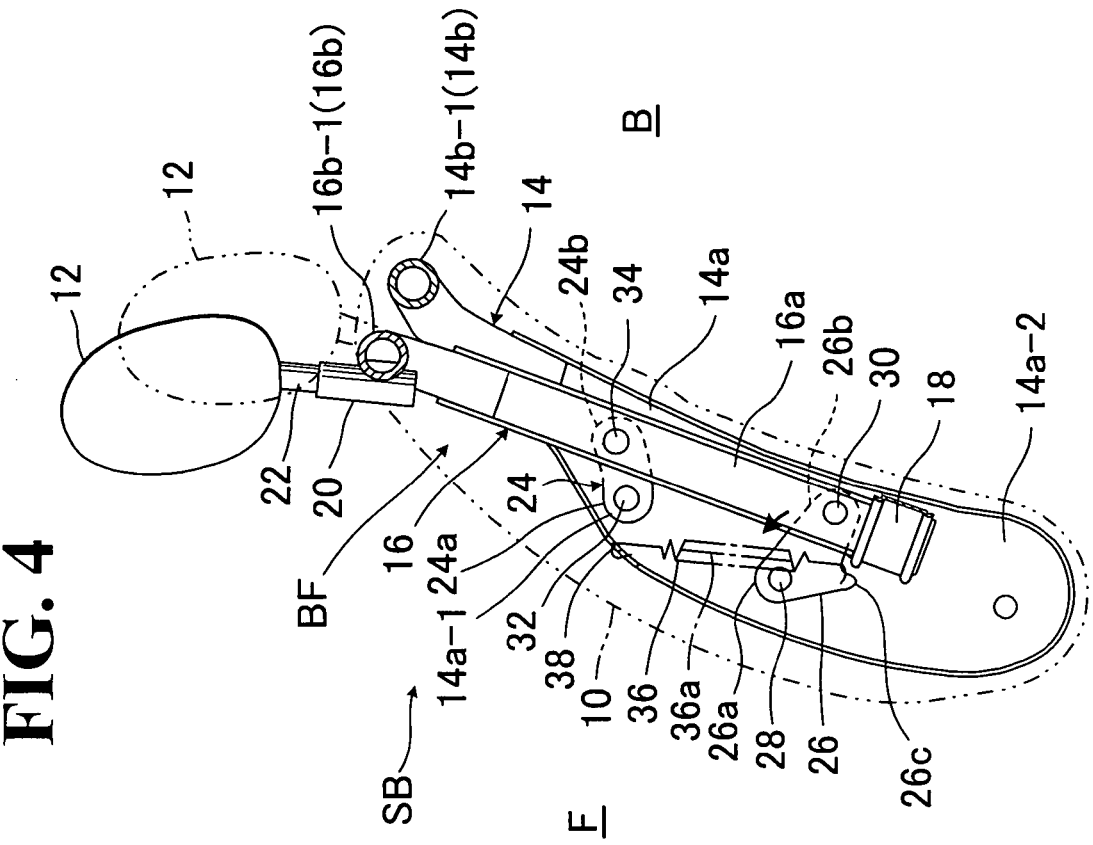
FIG. 3 is a longitudinally sectional view of the first embodiment, which explanatorily shows how an auxiliary frame and a headrest are displaced from their respective initial positions in a rear-end collision case.
Figure 4:
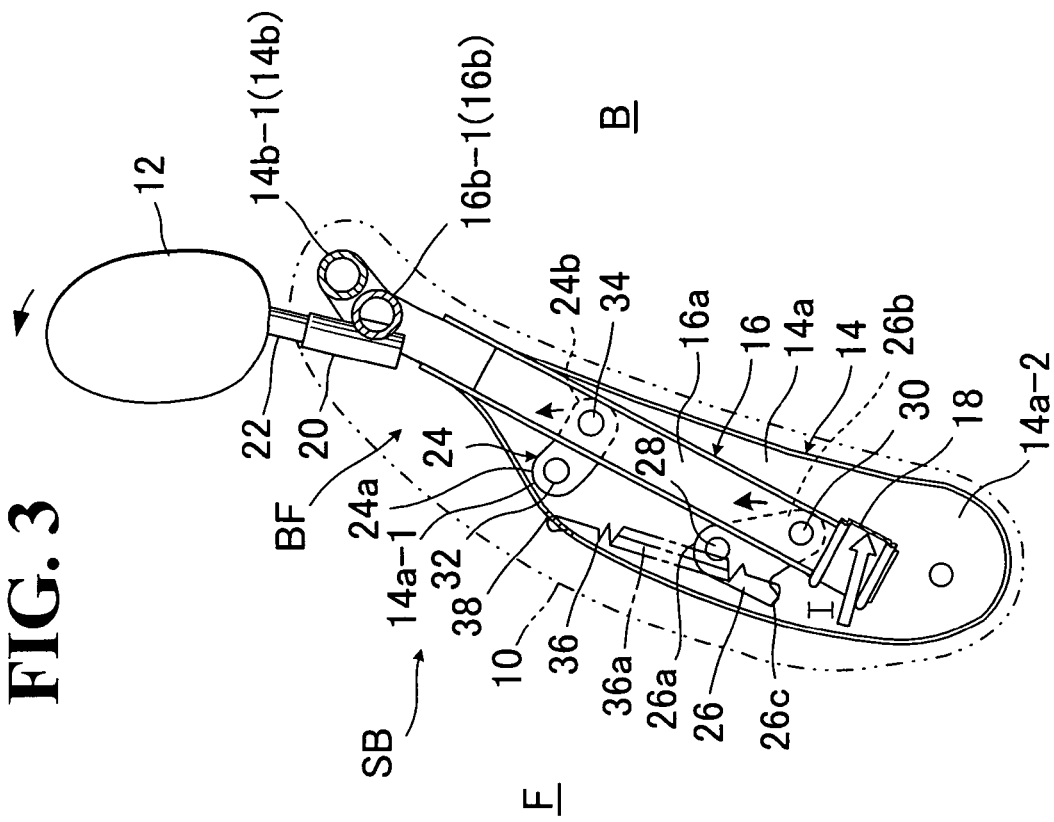
FIG. 4 is a longitudinally sectional view of the first embodiment, which explanatorily shows the state where the auxiliary frame and headrest are displaced to a given position to provide an emergency head support.

Referring first to FIG. 1, a generic and basic structure of seat back for vehicle seat in accordance with the present invention is illustrated, which commonly and generically covers one embodiment of seat back structure shown in FIGS. 2 to 4 and another alternative embodiment of seat back structure shown in FIGS. 5 to 8, within the gist and scopes of the present invention. Hence, it should be noted that those two embodiments are simply provided by way of preferred examples and not limitative.

FIG. 1 shows a backrest framework (BF) which is upholstered as indicated by (10) to form a seat back (SB) as seen from FIG. 3. The backrest framework (BF) is basically composed of a seat back frame (14) and an auxiliary frame (16) disposed inwardly of the seat back frame (14). The seat back frame (14) is a generally "inverted U" shape comprising an upper frame member (14b) and a pair of side frame members (14a) (14a). The auxiliary frame (16) is also of a generally "inverted U" shape comprising an upper frame member (16b) and a pair of side frame members (16a) (16a). As shown in FIG. 1, an impact receiving element (18) is firmly connected between the two lower end portions respective of the afore-said pair of side frame members (16a).

Designation (12) denotes a headrest provided on the auxiliary frame (16). Namely, the headrest (12) has a pair of headrest stays (22) (22), each being securely inserted in the respective pair of known cylindrical holders (20) (20) fixed to the horizontal top portion (16b-1) of the upper frame member (16b) of the auxiliary frame (16). As understandable from FIGS. 1 and 3, the headrest (12) is disposed above the top of the seat back (SB), while the auxiliary frame (16) itself disposed inwardly of and independently of the seat back frame (14).

The foregoing two-frame construction of seat back (SB), i.e. the combination of seat back frame (14) and auxiliary frame (16), is however known from the previously noted Japanese Laid-Open Patent Publication No. 2001-26232. Likewise as in such prior art, the auxiliary frame (16) is displaceable responsive to a rear-end collision so as to cause forward displacement of the headrest (12) toward a head of seat occupant. In brief, subject to a rear-end collision occurring, a backward inertia is generated at a seat occupant's wait portion, which applies a corresponding backward load to the impact receiving member (18), whereby the lower end portion of auxiliary frame (16) is displaced backwardly, while simultaneously, the headrest (12) is displaced toward a seat occupant's head. But, this is not the subject matter of the present invention and any further description is omitted thereon.

In accordance with the present invention, as generically indicated in FIG. 1, an upper guide means (24) and a combination of lower rotatable link means (26) and displaceable biasing means (36) are arranged in the above-described conventional backrest framework (BF) so as to provide for controlled displacement of both auxiliary frame (16) and headrest (12) to serve the purposes of the present invention as will be elaborated. As far as the FIG. 1 is concerned, briefly stated, the upper guide means (24) is provided between upper frame regions respective of the seat back frame (14) and auxiliary frame (16), whereas the lower rotatable link means (26) and biasing means (36) are provided between a lower frame regions respective of the seat back frame (14) and auxiliary frame (16). In the shown embodiment, there are provided a pair of the upper guide means (24) (24), a pair of lower link means (26) (26), and a pair of biasing means (36) (36). But, this is not limitative.

It should be noted that the term, "forward" or "forwardly", refers to a side (F) forwardly of the backrest framework (BF) or seat back (SB), whereas the term, "backward" or "backwardly", refers to a side (B) forwardly of the backrest framework (BF).

Now, a specific description of the seat back structure in the present invention will be made by referring to two exemplary embodiments thereof as well as the respective drawings.

At first, as far as all the embodiments to be described are concerned, each of the above-discussed upper guide means (24), lower link means (26) and biasing means (36) is provided in pairs, with identical structure and function. Thus, for simplicity, in each of the exemplary embodiments to be described below, a specific description will be only made of: one of the two upper guide means (24); one of the two lower link means (26); and one of the two biasing means (36).

Referring now to FIGS. 2 to 4, there is illustrated one exemplary embodiment of the above-discussed generic structure of the present invention. According thereto, while not clearly shown, but, in view of the foregoing, it should be understood that the foregoing pair of upper guide means (24) comprise a pair of upper guide link members (24), that the foregoing pair of lower link means (26) comprise a pair of lower link members (26), and that the foregoing pair of biasing means (36) comprise a pair of extension coil springs (36).

In the present embodiment, as shown in FIG. 2, for simplicity, a description will be made only of left-side half of the backrest framework (BF) as well as of one upper link member (24), one lower link member (26), and one extension coil spring (36).

As shown in FIG. 2, the upper guide link member (24) is of a downwardly arcuate shape having: a first bearing hole (24ha) formed in a forward end portion (24a) thereof; and a second bearing hole (24hb) formed in a backward end portion (24b) thereof. The forward end portion (24a) is rotatably connected by a pin or bolt (32) with an inward surface of the side frame (14a) of the seat back frame (14), whereas the backward end portion (24b) is rotatably connected by a pin or bolt (34) with an inward surface of the side frame member (16a) of the auxiliary frame (16). More specifically, as best seen from FIGS. 2 and 3, the forward end portion (24a) of upper guide link member (24) is rotatably pivoted via the bolt (32) to the forward local area in an upper end region (14a-1) of the side frame member (14a) associated with the seat back frame (14), whereas the backward end portion (24b) is rotatably pivoted via the bolt (34) to the midway region or relatively upper region of the side frame member (16a) associated with the auxiliary frame (16).

As shown in FIG. 2, the lower link member (26) is so formed as to have: a first bearing hole (26ha) formed in a forward end portion (26a) thereof; a second bearing hole (26hb) formed in a backward end portion (26b) thereof; and a lug portion (26c) with which a lower end of biasing spring (36) is engaged. As best seen in FIG. 3, such lug portion (26c) is defined between the forward and backward end portions (26a) (26b) as well as at a point below and forwardly of the first bearing hole (26ha). The forward end portion (26a) is rotatably connected by a pin or bolt (28) with an inward surface of the side side frame member (16a) of the seat back frame (16), whereas the backward end portion (26b) is rotatably connected by a second pin or bolt (30) with an inward surface of the side frame member (16a) of the auxiliary frame (16). Precisely stated, as depicted in FIGS. 2 and 3, the forward end portion (26a) of lower link member (26) is rotatably pivoted via a first bolt (28) to the forward local area in an intermediate region of the side frame member (14a) associated with the seat back frame (14), wherein such intermediate region of side frame member (14a) is defined between the upper and lower regions (14a-1) (14a-2) of the side frame member (14a), as can be seen in FIG. 3. The backward end portion (26b) of lower link member (26) is rotatably pivoted via a second bolt (30) to the lower end region of the side frame (16a) associated with the auxiliary frame (16).

Designation (38) stands for securing holes in which is securely engaged one end of the extension coil spring (36). As seen in FIGS. 2 and 3, such securing holes (38) are formed in a forwardly facing flange portion of the side frame (14a) so as to be situated right above and distant from the afore-said first bolt (28).

As show in FIG. 3, the extension coil spring (36) is at one end thereof engaged in the securing holes (38) and at another end thereof engaged with the lug portion (26c) of the lower link member (26), thereby giving a biasing force to the lower link member (26).

As constructed above, both upper guide link member (24) and lower link member (26) are movably disposed between the two lateral side frames (14a) and (16a) respectively of the seat back frame (14) and auxiliary frame (16).

FIG. 3 shows a initial position of both auxiliary frame (16) and headrest (12). Under such state, the lower link member (26) is retained by the extension coil spring (36) against rotation about the bolt (30), whereby the auxiliary frame (16) are positively retained against movement by both of the lower link member (26) and upper guide link member (24).

In this respect, the first bolt (28) is a pivotal supporting point of the lower link member (26) with respect to the seat back frame (14), while the second bolt (30) is a pivotal supporting point of that lower link member (26) with respect to the auxiliary frame (16). On the other hand, the first bolt (32) is a pivotal supporting point of the upper guide link member (24) with respect to the seat back framer (14), while the second bolt (34) is a pivotal supporting point of that lower link member (26) with respect to the auxiliary frame (16).

As constructed above, briefly stated, when the upper guide link member (24) and lower link member (26) are rotated anticlockwise about the respective two pivotal points (34) and (28), the auxiliary frame (16) is swingingly displaced backwardly and upwardly relative to the seat back frame (14), so that the headrest (12) is displaced forwardly and upwardly from the initial position, while keeping the auxiliary frame horizontal top portion (16b-1) out of contact with the seat back frame horizontal top portion (14b-1), thereby preventing direct exertion of the load upon the seat back frame (14).

At the initial position of the headrest (12) as in FIG. 3, it is important to note that a central line or a line of force (36a) of the extension coil spring (36) is positioned at a point forwardly of the first bolt (28) which is a pivotal point of the lower link member (26) with respect to the seat cushion frame (16) as stated above. Under that condition, the lower link member (26) is biasingly caused by the extension coil spring (36) to rotate clockwise relative to the pivotal point (at 28), whereby both auxiliary frame (16) and headrest (12) are resiliently and positively retained to their respective initial positions as shown in FIG. 3. While not shown, a proper stopper is provided to limit the clockwise rotation of the lower link member (26) so as to insure that the auxiliary frame (16) and headrest (12) are precisely positioned at their respective initial positions shown in the FIG. 3. It is noted here that the biasing force or contractive force of the extension coil spring (36) is set to such a degree at which the spring (35) will not be stretched by a load which is normally applied from a seat occupant's back portion to the backrest frame (BF) and pressure receiving member (18).

With the above-described arrangement, as indicated in FIG. 3, when a rear-end collision occurs, an excessive great backward load (l), which overcomes the biasing or contractive force of the extension coil spring (36), is applied to that pressure receiving element (18) from the seat occupant's waist portion (not shown) being moved backwardly under an inertia caused by the rear-end collision. Then, due to such great backward load (l), as indicated by the arrows in FIG. 3, the lower link member (26) is rotated about the pivotal point (at 28) anticlockwise, while simultaneously, the line of force (36a) of extension coil spring (36) is displaced from the home point forwardly of such pivotal point (28) (see FIG. 3) toward another point backwardly of that particular pivotal point (28) (see FIG. 4). As a result thereof, the biasing or contractive force of spring (36), which has been a clockwise force as stated above, is now changed into an anticlockwise force assisting in anticlockwise rotation of the lower link member (26) as understandable from FIG. 4, whereupon the auxiliary frame (16) is caused by such anticlockwise biasing force of spring (36) to displace forwardly and upwardly, which causes simultaneous forward and upward movement of the headrest (12) from the initial position indicated by the two-dot chain line toward an emergency head support position indicated by the solid line to provide a quick support to a seat occupant' head (not shown). In this regard, the upper guide link member (24) is also simultaneously rotated about the pivotal point (at 32), thereby guiding the auxiliary frame (16) in the forward and upward directions properly so as to avoid contact of the auxiliary frame upper portion (16b and 16b-1) with the seat back frame (14). As a result, both auxiliary frame (16) and headrest (12) are retained at such emergency head support position by the anticlockwise biasing force of spring (36).

In the present embodiment, even in such a minor rear-end collision case that, right after the line of force (36a) of extension coil spring (36) has been displaced past the pivotal point (28), the load (l) suddenly decreases too low to cause further upward and backward movement of the auxiliary frame (16), the biasing or contractive force of that spring (36) has just been changed into anticlockwise biasing force enough to cause anticlockwise rotation of the lower link member (26) as discussed earlier, and therefore, the auxiliary frame (16) is caused by the thus-changed biasing force of the spring (36) to move backwardly and upwardly, so that the headrest (12) reaches the foregoing emergency head support position as shown in FIG. 7. Hence, in this minor rear-end collision case, the backward and upward movement of auxiliary frame (16) does not cease, and the headrest (12) is quickly and smoothly moved to that emergency head support position, thereby assuring to provide a continued stable support to a head of seat occupant.

Also, let us assume that a great rear-end collision occurs, wherein, in addition to the excessive backward load (l) applied from a waist portion of seat occupant, another excessive backward load is also applied from a head of the seat occupant to the headrest (12). In that case, the line of force (36a) of extension coil spring (36) has already moved past the pivotal point (28), thereby providing a forward and upward biasing force, as discussed earlier, to both auxiliary frame (16) and headrest (12). Thus, the foregoing another excessive backward load from seat occupant's head is absorbed by that counter biasing force of spring (36) and reduced into a small load which is applied to the seat back frame (14). This effectively prevents an abrupt backward inclination of the seat back fame (14) or seat back (SB), so that the seat back frame (14) is assuredly prevented against damage and breakage. Further, a shock or impact absorbing effect is provided to the occupant's head.

Of course, the thus-displaced auxiliary frame (16) and headrest (12), as shown in FIG. 4, may be moved back to their respective initial positions shown in FIG. 3.

In the present embodiment, the upper guide link member (24) is a simplified guide means for effectively rotatively guiding the auxiliary frame (16) along a given circumference of circle having a center at the pivotal point (28), thereby keeping the auxiliary frame (16) out of contact with the seat back frame (14)

Reference is now made to FIGS. 5 to 8 which shows another alternative exemplary embodiment of the present invention. This embodiment is identical to the above-described first embodiment, only excepting a guide element (24') and a buffer member (46). Thus, all like designations indicated above correspond to all like designations to be given hereinafter, and any further explanation is omitted on all the common parts and elements between the present and previously described embodiments.

According to this particular embodiment, the guide element (24') and a guide pin (42) are provided as another alternative mode of the foregoing guide means (24) and basically formed by a plate body portion (24'c) having a guide hole (40) formed therein and a pair of offset leg portions (24'a) (24;b) which extends offset from the plate body portion (24'c) in a direction opposite to each other. The guide hole (40) is formed in a generally hook shape having a vertically elongated lower hole portion (40a) and an arcuate upper hole portion (40b).

As understandable from FIGS. 5 and 6, the guide element (24') is fixedly connected at the two leg portions (24'a) (24'b) thereof with the inwardly facing surface of upper end region (14a-1) of the seat back frame's side frame member (14a). On the other hand, the guide pin (42) is secured in a hole (16ah) formed in the upper region of the auxiliary frame side frame member (16a) such that a free end portion of the guide pin (42) projects outwardly of that side frame member (16a). As can be seen in FIG. 6, the free end portion (not designated) of guide pin (42) is slidably engaged in the vertically elongated lower hole portion (40a) of guide hole (40).

In brief, with the combination of the guide element (24') and guide pin (42), the auxiliary frame (16), to which the excessive backward load (l) is applied, is displaced in a predetermined direction, such that the upper horizontal portion (16b-1) of the auxiliary frame (16) is first moved upwardly and forwardly so as to avoid its contact with the seat cushion frame upper horizontal portion (14b-1), and then brought backwardly to contact with that particular upper horizontal portion (14b-1). This means that the headrest (12) is first displaced in the forward and upward direction to a predetermined head support point, thereby providing an emergency support to a seat occupant's head, and then quickly displaced in backward direction at a level equal in height to such head support point, thereby allowing slight backward movement of the seat occupant's head so as to avoid direct impact of the load (l) to the seat occupant's head.

More specifically, as understandable from FIGS. 6 and 7, in the upper region (14a-1) of seat back frame' side frame member (14a), the foregoing guide element (24') and guide hole (40) formed therein are disposed such that the vertically elongated lower hole portion (40a) of the guide hole (40) constitutes a rectilinear path along which the guide pin (42) is to slidably move upwardly with the anticlockwise rotation of the lower link member (26) so as to cause forward and upward displacement of both auxiliary frame (16) and headrest (12) in the same manner as described in the previously described first embodiment, and that, in addition thereto, the guide pin (42) further enters the arcuate upper hole portion (40b) communicating continuously with the lower hole portion (40a) and slidingly moves along that arcuate hole portion (40b), thereby allowing slight backward movement of both auxiliary frame (16) and headrest (12).

At the initial position of the headrest (12) as in FIG. 6, the line of force (36a) of extension coil spring (36) is positioned at a point forwardly of the pivotal point (at 28), while the guide pin (42) is in contact with the lower edge of the lower hole portion (40a). Under that condition, the lower link member (26) is biasingly caused by the extension coil spring (36) to rotate clockwise relative to the pivotal point (at 28), whereby both auxiliary frame (16) and headrest (12) are resiliently and positively retained to their respective initial positions as shown in FIG. 6. While not shown, a proper stopper is provided to limit the clockwise rotation of the lower link member (26) so as to insure that the auxiliary frame (16) and headrest (12) are precisely positioned to their respective initial positions shown in the FIG. 6.

With the above-described arrangement, as indicated in FIG. 6, when a rear-end collision occurs, an excessive great backward load (l), which overcomes the biasing or contractive force of the extension coil spring (36), is applied to that pressure receiving element (18) from the seat occupant's waist portion (not shown) being moved backwardly under an inertia caused by the rear-end collision. Then, due to such great backward load (l), as indicated by the arrows in FIG. 6, the lower link member (26) is rotated about the pivotal point (at 28) anticlockwise, while simultaneously, the line of force (36a) of extension coil spring (36) is displaced from the home point forwardly of such pivotal point (28) (see FIG. 6) toward another point backwardly of that particular pivotal point (28) (see FIG. 7). As a result thereof, the biasing or contractive force of the spring (36), which has been a clockwise force as stated above, is now changed into an anticlockwise force assisting in anticlockwise rotation of the lower link member (26) as understandable from FIG. 7, whereupon the auxiliary frame (16) is caused by such anticlockwise biasing force of spring (36) to displace forwardly and upwardly, which causes simultaneous forward and upward movement of the headrest (12) from the initial position indicated by the two-dot chain line toward an emergency head support position indicated by the solid line to provide a quick support to a seat occupant' head. Also, at the same time, the guide pin (40) is slidingly moved along the lower hole portion (40a) in the upward direction. Consequently, the auxiliary frame (16) is displaced in the forward and upward directions properly so as to avoid contact of the auxiliary frame upper portion (16b and 16b-1) with the seat back frame (14).

Likewise in the previous first embodiment, even in the minor rear-end collision case that, right after the line of force (36a) of extension coil spring (36) has been displaced past the pivotal point (28), the load (l) suddenly decreases too low to cause further upward and backward movement of the auxiliary frame (16), the biasing or contractive force of that spring (36) has just been changed into anticlockwise biasing force enough to cause anticlockwise rotation of the lower link member (26), and therefore, the auxiliary frame (16) is caused by the thus-changed biasing force of the spring (36) to move backwardly and upwardly, so that the headrest (12) reaches the foregoing emergency head support position as shown in FIG. 7. Hence, the backward and upward movement of auxiliary frame (16) does not cease, and the headrest (12) is quickly and smoothly moved to that emergency head support position, thereby assuring to provide a safe support to a head of seat occupant.

On the other hand, let us assume that a great rear-end collision occurs, wherein, in addition to the excessive backward load (l) applied from a waist portion of seat occupant, another excessive backward load is also applied from a head of the seat occupant to the headrest (12). In that case, the line of force (36a) of extension coil spring (36) has already moved past the pivotal point (28), thereby providing a forward and upward biasing force, as discussed earlier, to both auxiliary frame (16) and headrest (12). Thus, likewise in the first embodiment, the foregoing another excessive backward load from seat occupant's head is absorbed by that counter biasing force of spring (36) and reduced into a small load which is applied to the seat back frame (14), and therefore, the same effect and advantages as described in the first embodiment are also attainable. But, in the present second embodiment, it is also appreciated that, due to the excessive backward load (l) being exerted on the auxiliary frame (16), the guide pin (42), which has moved upwardly along the lower hole portion (40a), quickly enters the arcuate upper hole portion (40b) which extends backwardly, and slidingly moves therealong relative to the second bolt (30), thereby guiding the headrest (12) backwardly. This allows backward movement of the seat occupant's head together with the thus-guided headrest (12), hence preventing the seat occupant's head from being seriously hit against the headrest (12).

It is noted that the arcuate upper hole portion (40b) is formed along the circumference of a circle having its center at the second bolt (30) which has been positioned at the point shown in FIG. 7 when the auxiliary frame (16) has been displaced to a given level where the headrest (12) reaches the emergency head support position as in the FIG. 7.

Of course, the thus-displaced auxiliary frame (16) and headrest (12), as shown in FIG. 8, may be moved back to their respective initial positions shown in FIG. 6.

While having described the present invention thus far, it should be understood that the present invention is not limited to the illustrated embodiments, but any modification, replacement and addition may be applied thereto without departing from the scope of the appended claims.

What is claimed is:

1. A seat back structure in a vehicle seat, comprising:
a seatback frame having an upper portion and a lower portion, said seat back including a top frame member defined therein at a point above said upper portion thereof;
an auxiliary frame provided independently of said seat back frame, said auxiliary frame having an upper portion and a lower portion, and further including a top frame member defined therein at a point above said upper portion thereof;
a headrest provided on said upper portion of said auxiliary frame;
a buffer element provided to said top frame member of said seat back frame;
a pressure receiving portion provided in said lower portion of said auxiliary frame;
a link means rotatably provided between said lower portion of said seat back frame and said lower portion of said auxiliary frame, said link means including: a first pivotal point at which one end of the link means is pivotally supported to said seat back frame; and a second pivotal point at which another end of the link means is pivotally supported to said auxiliary frame;
a guide means for guiding said upper portion of said auxiliary frame in a predetermined direction in conjunction with said link means;

said auxiliary frame being displaceable via said link means and guide means so as to move said headrest between an initial position where the headrest is normally set and another position defined above said initial position;

a biasing element having a line of force therein, said biasing element being connected between said link means and said seat back frame, with such an arrangement that, when said headrest is set in said initial position, said line of force of said biasing means is positioned on one side of said first pivotal point, whereby the biasing element acts to biasingly retain both said link means and said auxiliary frame against movement, so that said headrest is retained at said initial position, and that, when an excessive backward load is applied to said pressure receiving portion, overcoming a biasing force of said biasing element, said link means is rotated to cause displacement of said line of force of said biasing element toward another side of said first pivotal point, whereby said auxiliary frame is biasingly caused by the thus-displaced biasing means to displace in a direction forwardly and upwardly of said seat back frame via said guide means and said link means, so that said headrest is moved from said initial position to said another position;

wherein said guide means comprises:

a guide element fixed to said upper portion of said seat back frame, said guide element having a generally hook shaped guide hole formed by a vertical hole portion and an arcuate hole portion communicating with said vertical hole portion; and a guide pin fixed to said upper portion of said auxiliary frame, said guide pin being slidably engaged in said generally hook shaped guide hole;

wherein, when said headrest is moved from said initial position to said another position, said guide pin is moved along said vertical hole portion, and, due to another load other than said load being applied to said headrest, said guide pin is further moved along said arcuate hole portion, thereby allowing said headrest to move in a direction backwardly of said seat back frame, with said top frame member of said auxiliary frame being brought to contact with said buffer element provided to said top frame member of said seat back frame.

2. The seat back structure as claimed in claim 1, wherein said biasing element comprises an extension coil spring.

3. The seat back structure as claimed in claim 1, wherein said seat back frame includes at least one side frame member having: an upper region corresponding to said upper portion of said seat back frame; and a lower region corresponding to said lower portion of said seat back frame; wherein said auxiliary frame includes at least one side frame member having: an upper region corresponding to said upper portion of said auxiliary frame; and a lower region corresponding to said lower portion of said auxiliary frame; wherein said guide means is pivotally connected between said upper region of said at least one side frame member of said seat back frame and said upper region of said at least one side frame of said auxiliary frame, and wherein said link means is pivotally connected between a predetermined area in said at least one side frame member of said seat back frame and said lower region of said at least one side frame of said auxiliary frame.

4. The seat back structure as claimed in claim 1, wherein said guide means and said link means are arranged such that, when said auxiliary frame is biasingly caused by said biasing element to displace in the direction forwardly and upwardly of said seat back frame, said guide pin is slidingly moved along said vertical hole portion of said generally hook shaped hole to thereby guide said top frame member of said auxiliary frame in said direction forwardly and upwardly of said seat back frame so as to avoid contact of said particular top frame member, thereby allowing smooth movement of said headrest from said initial position to said another position.

* * * * *